US008660615B2

(12) United States Patent
Brubacher-Cressman et al.

(10) Patent No.: US 8,660,615 B2
(45) Date of Patent: *Feb. 25, 2014

(54) LCD BACKLIGHT DURATION PROPORTIONAL TO AMOUNT OF INFORMATION ON THE LCD DISPLAY SCREEN

(75) Inventors: Dale K. Brubacher-Cressman, New Hamburg (CA); Jason Tyler Griffin, Waterloo (CA); Graham N. Pearce, Kitchener (CA); Peter N. Turner, Alpharetta, GA (US)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,128

(22) Filed: Apr. 3, 2012

(65) Prior Publication Data
US 2012/0190410 A1    Jul. 26, 2012

Related U.S. Application Data

(63) Continuation of application No. 12/555,861, filed on Sep. 9, 2009, now Pat. No. 8,175,654, which is a continuation of application No. 11/733,521, filed on Apr. 10, 2007, now Pat. No. 7,606,603, which is a continuation of application No. 10/788,599, filed on Feb. 27, 2004, now Pat. No. 7,221,964.

(51) Int. Cl.
*H04M 1/00* (2006.01)
*H04B 1/40* (2006.01)

(52) U.S. Cl.
USPC .......................................... 455/566

(58) Field of Classification Search
USPC ............. 455/574, 566, 550.1, 575.1; 345/102
See application file for complete search history.

(56) References Cited

U.S. PATENT DOCUMENTS

| | | | | |
|---|---|---|---|---|
| 5,548,832 | A | * | 8/1996 | Karam ........................ 455/226.4 |
| 6,091,031 | A | * | 7/2000 | Lee et al. ................... 178/18.01 |
| 6,219,021 | B1 | | 4/2001 | Izumi |
| 6,278,887 | B1 | * | 8/2001 | Son et al. ....................... 455/566 |
| 6,373,397 | B1 | | 4/2002 | Song |
| 6,480,727 | B1 | | 11/2002 | Gerdisch |

(Continued)

FOREIGN PATENT DOCUMENTS

| | | |
|---|---|---|
| EP | 0 756 224 A2 | 1/1997 |
| EP | 0 907 158 A1 | 4/1999 |

(Continued)

OTHER PUBLICATIONS

EPO: Extended European Search Report for Application No. 10151132.7-2414 dated Mar. 12, 2010 (7 pages).

(Continued)

*Primary Examiner* — Blane J Jackson
(74) *Attorney, Agent, or Firm* — Jones Day

(57) ABSTRACT

This relates to a method for controlling illumination of a display screen on a mobile device. A light source is turned on to illuminate the display screen. An amount of information displayed on the display screen is identified. An amount of time to keep the light source turned on is determined based at least in part on the identified amount of information. The light source is kept turned on at a first intensity level for the amount of time and then turned to a second intensity level.

20 Claims, 8 Drawing Sheets

(56) References Cited

U.S. PATENT DOCUMENTS

| | | | |
|---|---|---|---|
| 6,516,421 B1 | 2/2003 | Peters | |
| 6,574,486 B1 | 6/2003 | Labban | |
| 6,829,494 B2 | 12/2004 | Tanabe | |
| 6,898,443 B2 | 5/2005 | Yamaoka et al. | |
| 6,963,340 B1* | 11/2005 | Alben et al. | 345/501 |
| 7,117,019 B2* | 10/2006 | Abbasi | 455/566 |
| 7,415,293 B1* | 8/2008 | Lee | 455/574 |
| 8,204,554 B2* | 6/2012 | Goris et al. | 455/574 |
| 8,238,979 B2* | 8/2012 | Rajamani et al. | 455/566 |
| 2001/0027123 A1* | 10/2001 | Ishigaki | 455/566 |
| 2002/0142808 A1 | 10/2002 | Abbasi | |
| 2003/0071805 A1 | 4/2003 | Stanley | |
| 2003/0073467 A1 | 4/2003 | Tanaka et al. | |
| 2003/0104841 A1 | 6/2003 | Yamamoto | |
| 2004/0192411 A1 | 9/2004 | Shim | |
| 2004/0204016 A1 | 10/2004 | Sakamoto | |
| 2004/0204125 A1 | 10/2004 | Messel et al. | |
| 2005/0104805 A1 | 5/2005 | Masaki | |
| 2005/0119032 A1 | 6/2005 | Airas | |

FOREIGN PATENT DOCUMENTS

| | | |
|---|---|---|
| EP | 1 195 971 A2 | 4/2002 |
| JP | 07131511 | 5/1995 |
| WO | 2005/022871 | 1/2005 |

OTHER PUBLICATIONS

EPO: Communication pursuant to Article 94(3) EPC for Application No. 10151132.7-2414 dated Jul. 27, 2010 (7 pages).

EPO, Patent Abstracts of Japan, Publication No. 07131511 dated May 19, 1995 to Hitachi Ltd. (1 pg).

EPO: Partial European Search Report for Application 04004554.4, with Annex, Aug. 18, 2004 (2 pgs).

* cited by examiner

| DIM MODE DURATION TIME | |
|---|---|
| SET TO DIM MODE WARNING | YES |
| SELECT DIM MODE WARNING TIME OUT | 30 SEC |

FIG.8

| DEFAULT LIGHT ON SETTINGS | |
|---|---|
| DEFAULT TIME (SEC.) FOR E MAIL | 10 |
| DEFAULT TIME (SEC.) FOR CALENDAR | 20 |
| DEFAULT TIME (SEC.) FOR MAIN SCREEN | 5 |
| RESET TO DEFAULT | |

FIG.9

LCD BACKLIGHT DURATION PROPORTIONAL TO AMOUNT OF INFORMATION ON THE LCD DISPLAY SCREEN

CROSS-REFERENCE TO RELATED APPLICATION

This is a continuation of U.S. application Ser. No. 12/555,861, filed Sep. 9, 2009, which is a continuation of U.S. application Ser. No. 11/733,521, filed Apr. 10, 2007, now U.S. Pat. No. 7,606,603, which is a continuation of U.S. application Ser. No. 10/788,599, filed Feb. 27, 2004, now U.S. Pat. No. 7,221,964, all the above applications incorporated herein by reference.

FIELD OF THE INVENTION

The present invention relates to the field of wireless communications devices and, especially, to wireless communications devices having an electronic display of information.

BACKGROUND OF THE INVENTION

Wireless communications device users in a business environment need to have information comfortably and reliably. A major determiner of the effectiveness of a wireless communications device is the weight of the battery powering the device. Much research has occurred to try to optimize battery performance. There are three major techniques used to optimize battery performance: reducing the weight of the battery, increasing the energy density of the battery, and using less energy per unit time from the battery.

Lighting, data processing, alarm operation, and wireless transmission are all power consuming activities. Current techniques use a dumb timer to determine the amount of time power is applied to the light for a display. These techniques have been inadequate in many cases, such as when there is a great amount of text to read or when the material displayed requires careful reading. In these cases, the viewer needs to exercise a key board or thumb wheel to keep the light from turning off before the viewer is finished viewing the display screen. In other cases, where the material is quickly understood by the viewing, energy is wasted while the display remains lit beyond the point of usefulness.

Thus, there is a need for a lighting method for a display that optimizes the use of power and optimizes the understanding of the displayed information by a user of the wireless communications device.

SUMMARY OF THE INVENTION

The present invention relates to a method and device that optimizes the amount of time a display is lit.

In the present invention, the device firmware determines the amount of information on the display screen and then sets the light inactivity timer to be proportional to the amount of determined information. One or more factors are taken into consideration by a processing algorithm in the wireless communications device. Chief amongst the factors is the amount of information displayed within the view screen. The duration of power being applied to the light for the display may be established through the amount of information to be displayed. Other factors that may be used to establish the time of duration are the font size of the characters to be displayed, the type of activity, and the amount of ambient light. Examples of types of activity include e-mail composition, browser use, calendar use, phone usage, e-mail reading, task lists, and e-mail message searches.

Additional aspects and features of the invention will be apparent to those skilled in the art and include a computer program product having a computer readable medium tangibly embodying computer executable code for composing a destination for an outgoing communication generated by a wireless communications device for use in a wireless network.

BRIEF DESCRIPTION OF THE DRAWINGS

Embodiments of present invention will now be described by way of example with reference to attached figures, wherein:

FIG. 8 illustrates a submenu of the menu of FIG. 6 for setting a dim mode;

FIG. 9 illustrates an embodiment of a user profile; and

DETAILED DESCRIPTION

The present invention relates to a method, and wireless communications device that incorporates this method, for optimizing the time a display is in a lit state. The present invention offers a light power technique that is adaptive to a setting. Generally, in the present invention, the greater the amount of information on a display, the longer the time the display screen of the wireless communications device will be lit to permit a user to read a screen of information. Also, in the present invention, display lighting times will be increased when smaller font characters are to be displayed if the amount of information increases. In an embodiment of the present invention, a lighting timing learning mode may be implemented to accommodate users with varying reading capabilities.

A user interface for wireless communications device includes a component to compose a destination for an outgoing communication generated by the device. The component provides alternative composition means comprising a prompt for receiving the destination from a user; and a hot list of candidate destinations from which the user may select the destination. The component may be invoked directly from a home screen of the user interface by keying the destination. Entry from the main screen may populate the prompt with the keyed destination to speed calling operations.

Figure 1:
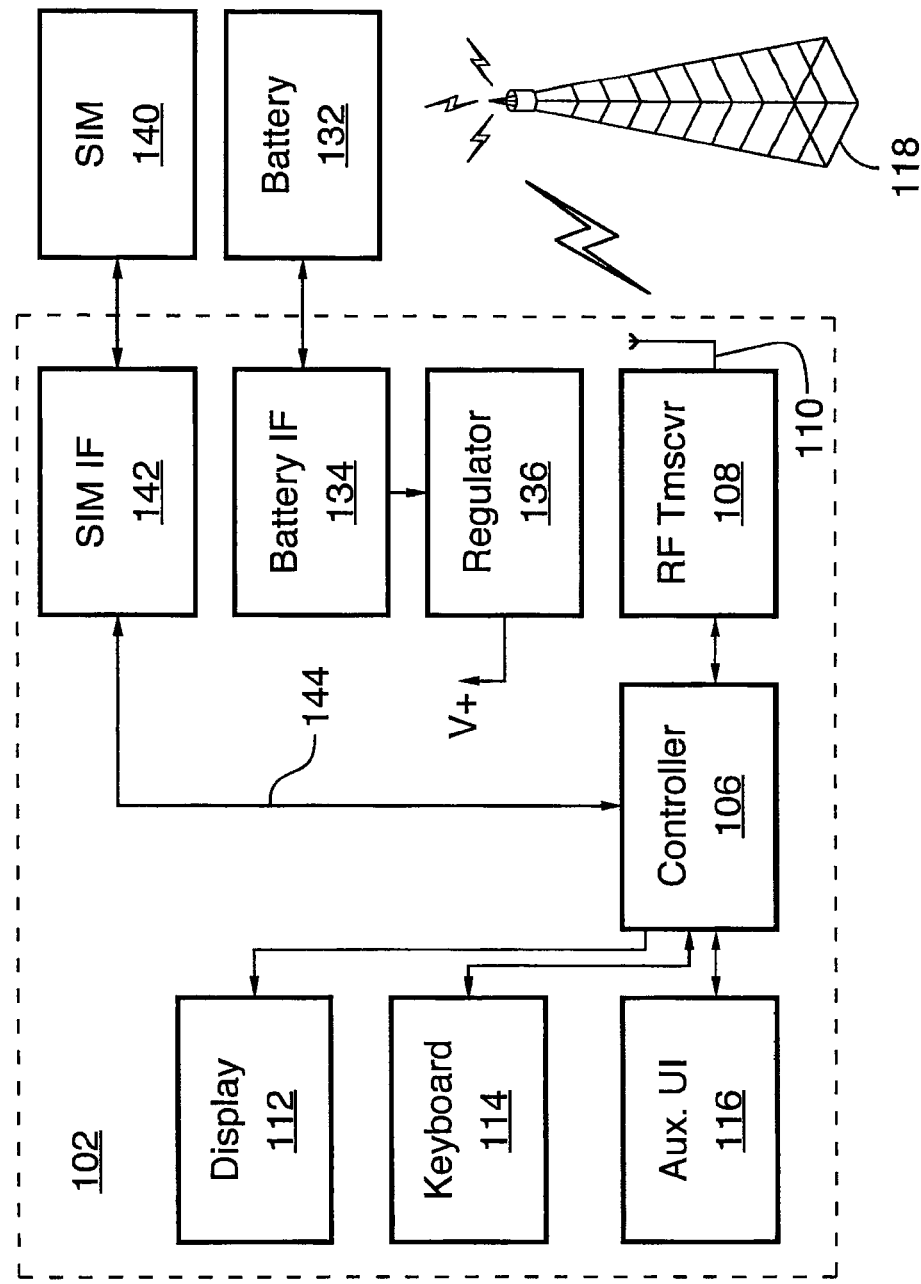
FIG. 1 is a block diagram that illustrates pertinent components of a wireless communications device that communicates within a wireless communication network according to the present invention.

FIG. 1 is a block diagram of a communication system 100 that includes a mobile station 102 that communicates through a wireless communication network symbolized by station 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) that runs operating system software in a memory component (not shown). Controller 106 will normally control overall operation of mobile station 102, whereas signal-processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from the wireless network 104 over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 that regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including date book (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
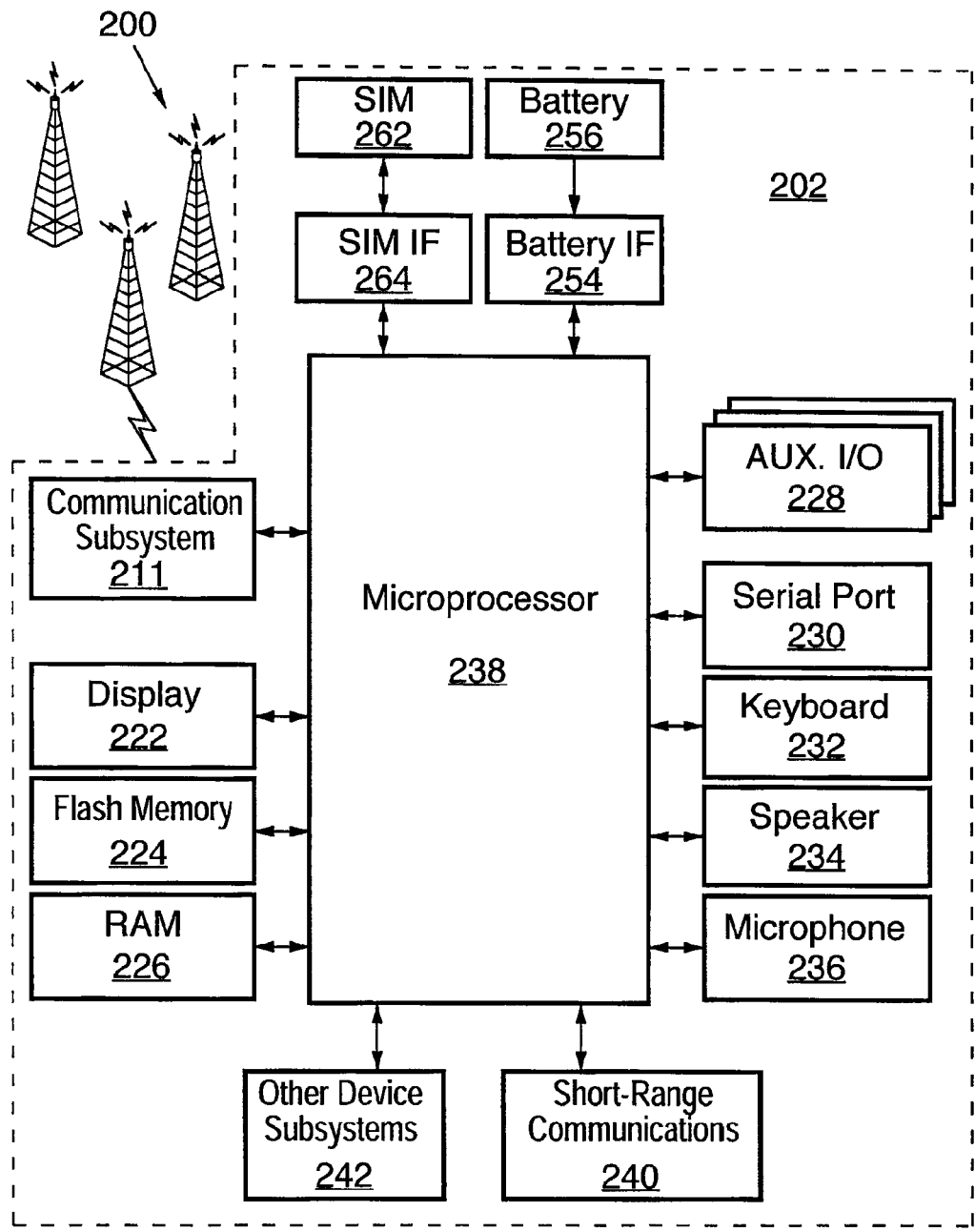
FIG. 2 is a more detailed diagram of a preferred wireless communications device of FIG. 1 according to the present invention.

FIG. 2 is a detailed block diagram of a preferred mobile station 202. Mobile station 202 is preferably a two-way wireless communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) that provides power V+ to all of the circuitry.

Mobile station 202 includes a microprocessor 238 (which is one implementation of controller 106 of FIG. 1) that controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described further herein below with reference to FIGS. 3-7. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is a multi-tasking wireless communications device configured for sending and receiving data items and for making and receiving voice calls. To provide a user-friendly environment to control the operation of mobile station 202, an operating system resident on station 202 (not shown) provides a GUI having a main screen and a plurality of sub-screens navigable from the main screen. The tasks performed by the multi-tasking wireless communications device may include e mail composition, e mail message display, web based browsing, calendar, phone list, and e mail message search.

Figure 3:
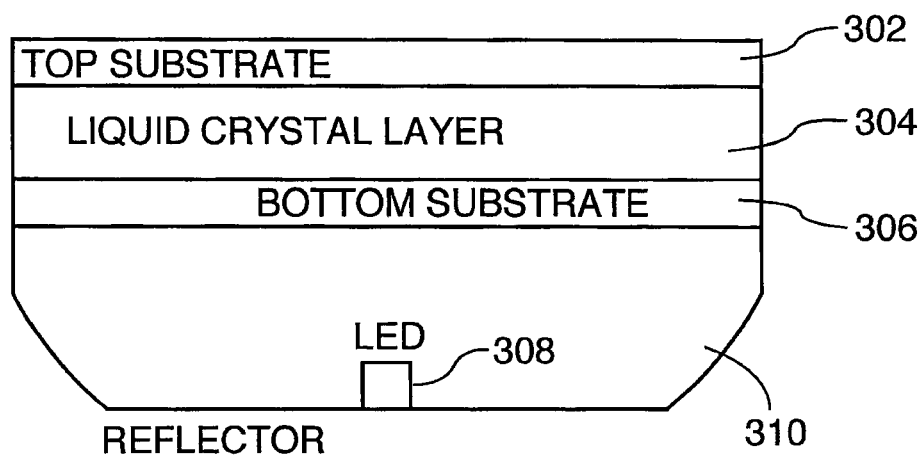
FIG. 3 illustrates an embodiment of a backlit liquid crystal display.

In the preferred embodiment, the display on the wireless communications device is a liquid crystal display (LCD), as illustrated in FIG. 3. In a general construction, the LCD is composed of three layers: a top substrate, a liquid crystal layer, and a bottom substrate. A liquid crystal display may operate in a light reflective mode when ambient light is sufficient or may be lit by a light source within or on the wireless communications device. When the LCD is illuminated by a light source 308 in a back lighting mode, the top and bottom substrates 302, 306 must be sufficiently transparent to provide a viewable display. At least one of the substrates may be an active matrix substrate with thin film transistors. Alternatively, the LCD may be a passive matrix device. Included as part of one or both of the substrates may be one or more brightness enhancing, light scattering, colour filter, black matrix, retarder, and/or adhesive layers. The liquid crystal layer 304 may be twisted nematic, super twisted nematic, cholesteric, discoidal, nematic, or the like. Where feasible, two or more liquid crystals may be used together as a mixture or in adjacent regions of the liquid crystal display. The light source 308 is preferably a light emitting diode (LED) for reasons of cost, compactness, luminance, and weight. The LED is preferably placed behind the liquid crystal display in relation to a viewer, but may be placed, additionally or optionally, at the edge or on the viewer's side of the liquid crystal display. To maximize the amount of light utilized, a reflector 310 is preferably is disposed beneath the light source 308.

Figure 10:
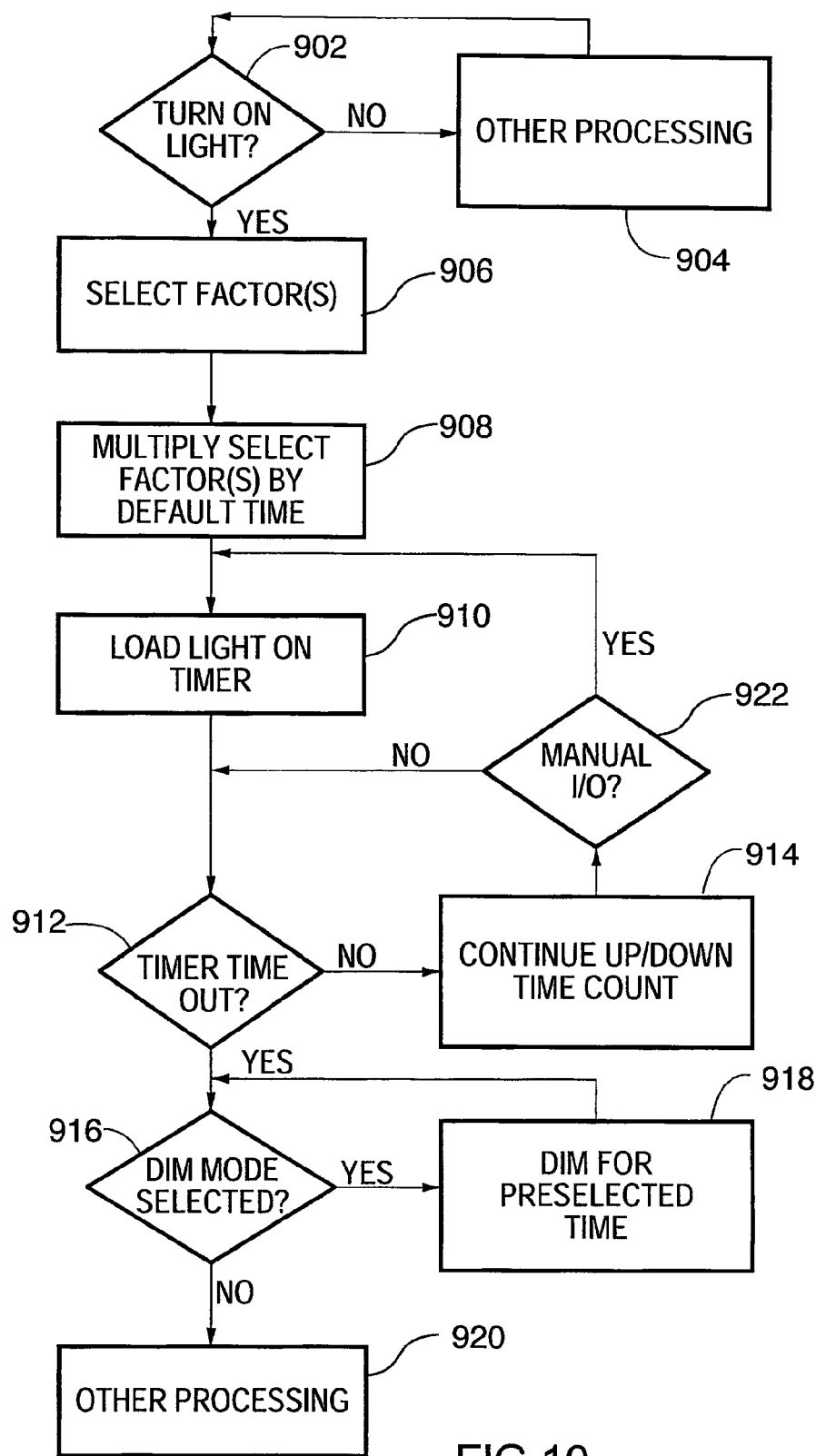
FIG. 10 illustrates an embodiment of the general method of the present invention.

As the light source 308 for the display consumes power as a function of being turned on and intensity when turned on, it is important to optimize the on time and, optionally, intensity. This is accomplished by relating turn on time (and, optionally, intensity) to one or more factors. Factors used in determining the on time for the light source may include the amount of information to be displayed, font size of the characters to be displayed, the type of task being performed, and ambient light levels. Ambient light levels may be sensed by a light sensor and may be used to determine a particular intensity of lighting and/or a particular duration of the lighting. This sensor, if implemented, is preferably placed at the edge of the LCD to minimize a user's risk of covering up the sensor and to more accurately sense the light level received by the LCD. FIG. 10 illustrates an embodiment of a method of the present invention in which the light is turned on 902. If no light has been turned on, other processing continues 904. When the light is turned on, as by the user hitting the backlight key or from hitting any key in an automatic mode, multiple factors selected by a manufacturer or end user 906 may be incorporated into an algorithm or may be simply multiplied together with a default time to establish a time on value to be loaded into a timer register 908. The time on value is loaded into the timer 910 for a count down operation or is used in a comparator operation for a count up operation 912. The timer count up/down continues 914 until the timer times out 912 unless the user scrolls a thumbwheel or pushes a key 922 causing the timer to reload the time on value. An optional dim mode may be implemented 916 such that when a light on timer time out occurs, the end user is not left in the dark but has some warning that the light will be extinguish within a short period of time 918. That is, the dim mode may cause the light to dim for a preselected time before shutting the light off completely. The dim mode time may be selectable by the manufacturer or end user or both.

Figure 4:
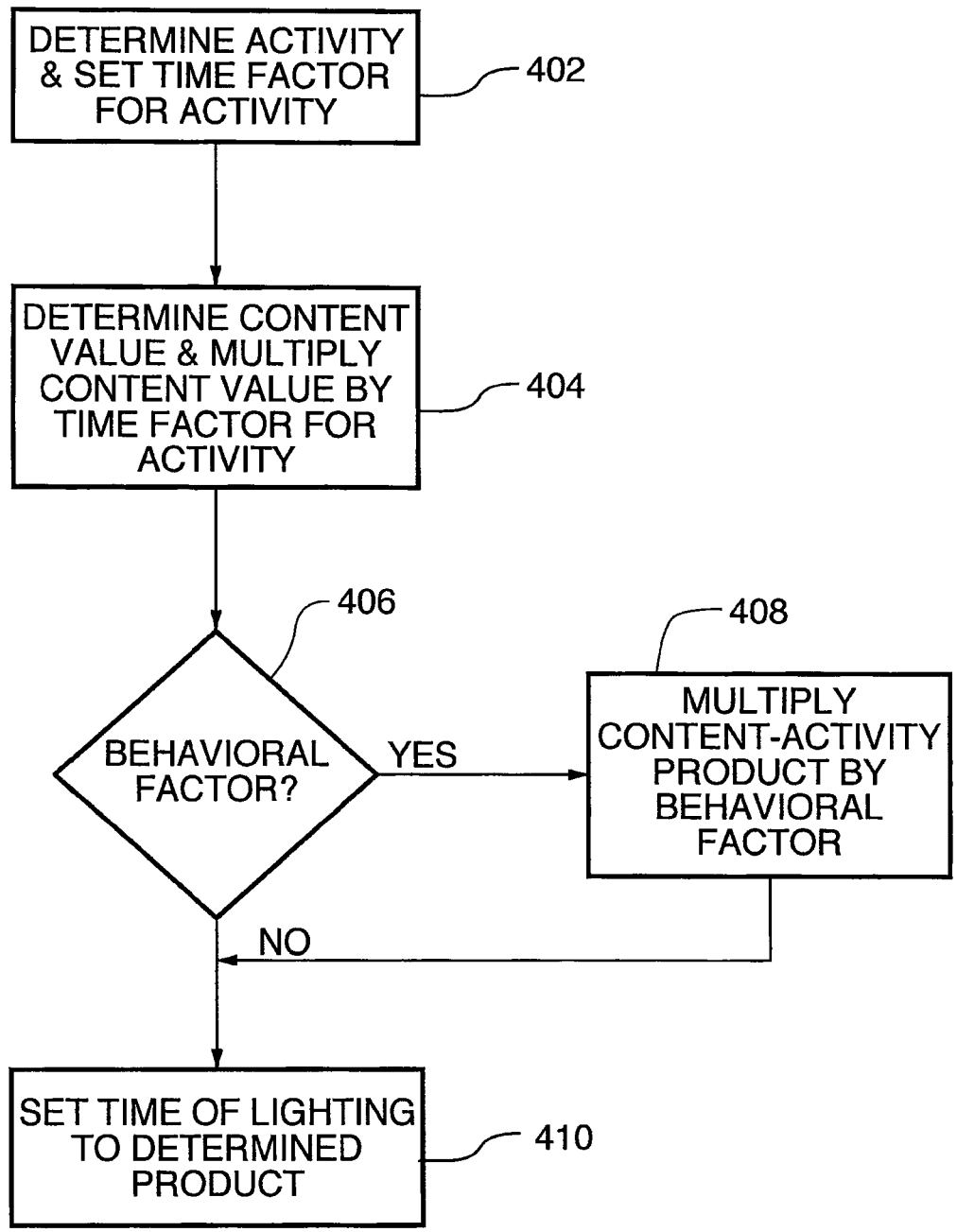
FIG. 4 illustrates a first embodiment of the method of the present invention.
Figure 5:
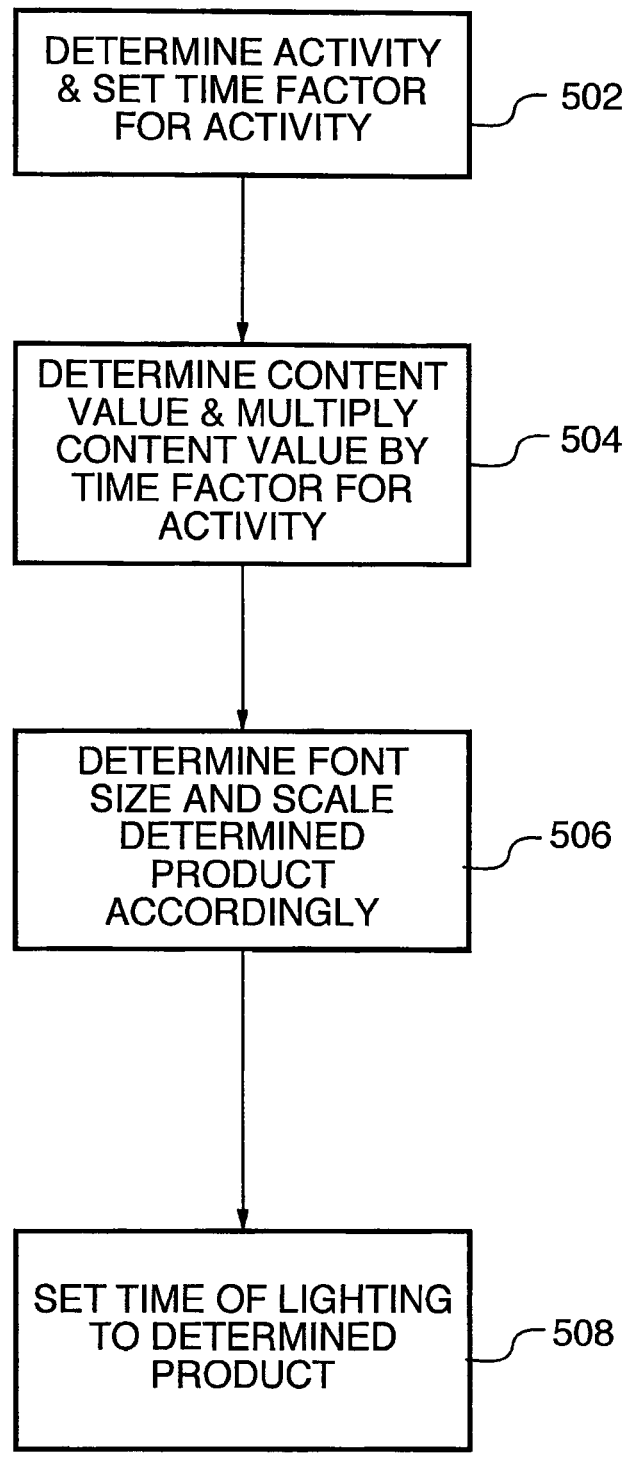
FIG. 5 illustrates a second embodiment of the method of the present invention.

FIGS. 4 and 5 illustrate more specific embodiments of the method of the present invention. In FIG. 4, activity typing 402 and amount of information to be displayed 404 determine a timer quantity. A default time value may also be used to determine the timer quantity. For example, if the activity typing factor were 2, the amount of information were 5, and the default time value were 10 seconds, the resulting time on product would be 100 seconds. The wireless communications device may have a learning mode in which behavioural heuristics of the end user may be kept as to how often a user forces the backlight on or off to determine if time outs need to be lengthened or shortened. In FIG. 4, if a behavioural factor were present or selected 406, the behavioural factor may be multiplied with the timer quantity to determine a new timer quantity. In the embodiment of the method illustrated by FIG. 5, the type of activity 502, the amount of information (or, content) 504, and the font size (or type) 506 are used to derive the time on of the light source 508. The amount of information may be determined through the number of ASCII characters to be displayed on the screen, the number of informative ASCII characters to be displayed on the display screen (e.g., characters that are not the space character), the number of data words retrieved from memory for the display, the number of data words buffered representing characters contemporaneously displayed as determined by the selected font size, and the like.

Figure 6:
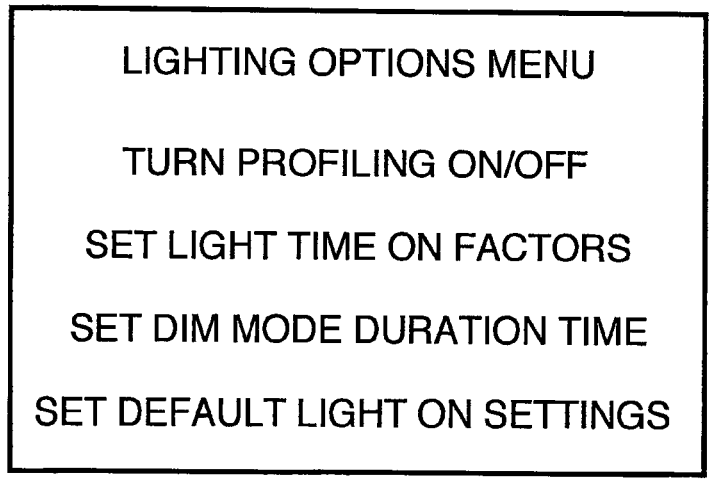
FIG. 6 illustrates an embodiment of a light source timer-setting menu.
Figure 7:
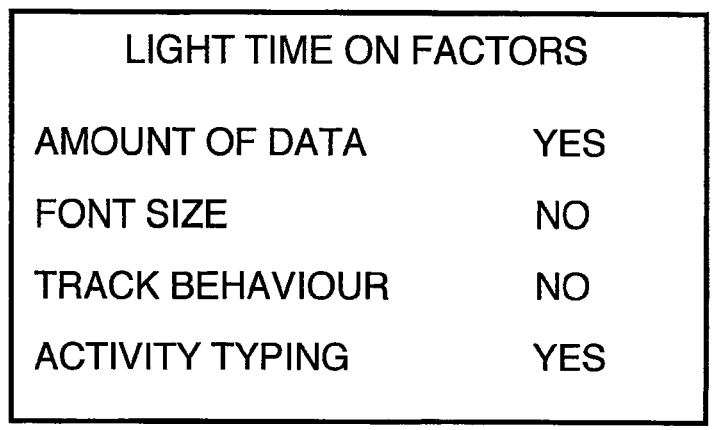
FIG. 7 illustrates a submenu of the menu of FIG. 6 for setting the time out value.

FIGS. 6-8 illustrate an embodiment of the method of the present invention in which menus are used to set the light source time on value with an optional dim mode. In FIG. 6, the end user or manufacturer may choose to set the time on factors and/or the dim mode duration time from a lighting options menu. In FIG. 7, when the time on factors menu is selected, the end user or manufacturer may choose to set the light on timing to the amount of data to be displayed, font size (or type), behavioural heuristics, activity, and the like. The behavioural heuristics may include the keeping of a log file of backlight usage duration for an activity in which the backlight usage duration is averaged and/or is weighted more heavily for recent activity of a user. The log file of backlight usage duration may also be set to cutoff consideration of any usage before a predetermined date such as any activity more than a month old. In FIG. 8, a dim mode duration time menu permits the dim mode to be used as a warning to the end user that the lighting is to be timed out. If the dim mode warning is selected, the dim mode warning time out may be set. This could be a value of only one second or two or may be a higher value, such as 30 seconds or one minute.

In an embodiment of the present invention, as illustrated in FIG. 9, a user profile may be established. The user profile, unique to each user if there are more than one users, may provide a unique default time for illumination duration for an activity, such e mail, calendar, and the main screen. A reset to default may be provided as an option in case for a new user or a user who wishes to have his or her use activity recalibrated.

The present invention may be practiced in a variety of ways. The on time may also be made determinable by the type of information on the display, e.g., graphs or photographs. Since some activities, such as e mail composition and message reading, are more likely to benefit than other activities for light source on time adjustability, the invention may be practiced such that only certain activities entered by an end user result in adjustment to the on time for the light source while others require no special adjustment. Although a dim power mode has been described, other power modes may be implemented instead or in addition, such as an idle mode, a screen saver mode, a standby mode, and a power down mode. The light source illuminating the LCD may use discrete levels, as described above, or may have continuously variable light intensity. A dedicated button may be provided on the body of the wireless communications device to permit a user to step through various states, such as high to dim to off to high.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

The invention claimed is:

1. A method for controlling illumination of a display screen of a mobile device, comprising:
    turning on a light source to illuminate the display screen;
    identifying a first factor relating to information displayed on the display screen and setting a first timing value based on the identified first factor;
    identifying a second factor relating to the information displayed on the display screen and setting a second timing value based on the identified second factor;
    calculating a time period as a function of the first and second timing values;
    if a user input is not detected before expiration of the time period, then turning the light source from a first intensity level to a second intensity level at the end of the time period; and if a user input is detected before expiration of the time period, then keeping the light source on at the first intensity level for an amount of time beyond the end of the time period.

2. The method of claim 1, wherein the time period is based on multiplying together the first timing value, the second timing value and a default timing value.

3. The method of claim 1, wherein the first factor is an amount of information displayed on the display screen and the second factor is a font size of the information displayed on the display screen.

4. The method of claim 1, wherein the first factor is a measured ambient light level.

5. The method of claim 1, wherein the first factor is whether the displayed information includes a photograph.

6. The method of claim 1, wherein the second intensity level is off.

7. The method of claim 1, wherein the second intensity level is not off but dimmer than the first intensity level.

8. The method of claim 1, wherein the time period is unique for each of multiple users of the mobile device.

9. The method of claim 1, further comprising receiving a user input before the end of the time period, and in response extending the first intensity level beyond the end of the time period.

10. A method for controlling illumination of a display screen, comprising:
   turning on a light source to illuminate the display screen;
   identifying an amount of information displayed on the display screen;
   determining a time period to keep the light source turned on based at least in part on the identified amount of information; and
   keeping the light source turned on at a first intensity level for the time period, and then turning the light source to a second intensity level, dimmer than the first intensity level, for an additional amount of time before turning the light source off.

11. The method of claim 10, wherein said time period is proportional to the amount of information displayed.

12. The method of claim 10, wherein the additional amount of time is preselected by a user of a device that includes the display screen.

13. The method of claim 10, wherein the determining step includes determining the amount of time based also on a type of task being performed by a device that includes the display screen.

14. The method of claim 10, wherein the display screen is a part of a mobile communication device.

15. The method of claim 10, wherein the display screen is part of a computer.

16. The method of claim 10, wherein said determining includes determining the time period based also on a measured ambient light level.

17. The method of claim 10, wherein said determining includes determining the time period based also on whether the displayed information includes a photograph.

18. The method of claim 10, wherein the time period is unique for each of multiple users of the mobile device.

19. The method of claim 18, wherein the time period is unique for each type of activity for each of the multiple users of the mobile device.

20. The method of claim 9, said extending is by resetting the time period to start again from when the user input occurred.

* * * * *